United States Patent
Fergen

[11] Patent Number: 5,916,448
[45] Date of Patent: Jun. 29, 1999

[54] CHEMICAL CONDITIONING OF LIQUID AND SEMI-LIQUID SLUDGE FOR DEWATERING, ODOR CONTROL, PATHOGEN CONTROL, NUTRIENT ENHANCEMENT OF THE RESIDUAL, AND HANDLING CHARACTERISTICS

[75] Inventor: Robert E. Fergen, Raleigh, N.C.

[73] Assignee: Hazen & Sawyer P.C., Hollywood, Fla.

[21] Appl. No.: 08/920,324

[22] Filed: Aug. 22, 1997

Related U.S. Application Data

[60] Provisional application No. 60/024,474, Aug. 23, 1996.

[51] Int. Cl.$^6$ .................................................. C02F 1/52
[52] U.S. Cl. ...................... 210/723; 210/738; 210/764; 210/770; 210/916
[58] Field of Search ................................ 210/749, 751, 210/764, 702, 723, 724, 738, 770, 916

[56] References Cited

U.S. PATENT DOCUMENTS

| | | | |
|---|---|---|---|
| 4,793,927 | 12/1988 | Meehan et al. | 210/751 |
| 5,125,951 | 6/1992 | Cahoda et al. | 71/12 |
| 5,246,596 | 9/1993 | Baldwin, Jr. et al. | 210/750 |
| 5,281,341 | 1/1994 | Reimers et al. | 210/760 |
| 5,385,673 | 1/1995 | Fergen | 210/710 |

*Primary Examiner*—Jay H. Woo
*Assistant Examiner*—Betsey J. Morrison
*Attorney, Agent, or Firm*—Malin, Haley, DiMaggio & Crosby, PA

[57] ABSTRACT

A method is provided for improving the dewatering and odor reduction characteristics of a liquid wastewater sludge, sediment, or soils to ultimately form a dewatered solid residual that includes nutrition enhancement of a resultant material that is suitable for distribution and marketing, and for incorporation in a fertilizer blend. The material meets Class A pathogen reduction by achieving disinfecting conditions. The method includes the addition of selective acids and bases to the liquid sludge which forms insoluble precipitates, and enmeshes the solids in the sludge to form a granular product. The method's applicability includes municipal, agricultural, food processing, industrial liquid and semi-liquid sludges, sediments, and soils.

6 Claims, 2 Drawing Sheets

CHEMICAL CONDITIONING OF LIQUID AND SEMI-LIQUID SLUDGE FOR DEWATERING, ODOR CONTROL, PATHOGEN CONTROL, NUTRIENT ENHANCEMENT OF THE RESIDUAL, AND HANDLING CHARACTERISTICS

This application claims the benefit of U.S. provisional application Ser. No. 60/024,474, filed Aug. 23, 1996.

BACKGROUND OF THE INVENTION

1. Field of the Invention

This invention relates generally to the treatment of wastewater sludge and in particular, to a method of treating municipal, agricultural, food processing, and industrial liquid and semi-liquid sludge to form insoluble precipitates, increase the nutrient value of the residual precipitates, destroy pathogenic organisms, bind odors, and greatly improve the dewatering, drying, and handling characteristics.

2. Description of the Prior Art

The need to treat municipal wastewater sludge and to provide various methods to permit beneficial reuse of the sludge is well known in the art. Alkaline treatment is one such method and is an effective means for stabilizing sludge by increasing the pH of the sludge to 12 standard units (s.u.) or higher. Typically, the use of lime requires stabilization dosages of approximately 0.2 pounds of lime per pound of solids. If the sludge is also subjected to temperatures of 70° C. or over for at least 30 minutes, the result is a complete disinfection, commonly referred to as pasteurization. Pasteurization results in the destruction of pathogens and indicator organisms making the sludge suitable for general plant nutrient supplementation and soil conditioning without a site specific application permit. The Environmental Protection Agency recognizes this type of process as a Process That Further Reduces Pathogens (PFRP) in 40 C.F.R. §257 and as Class A in 40 C.F.R. §503 and allows unrestricted contact with biosolids so treated.

When calcium oxide (quicklime or CaO) or magnesium oxide (MgO) is added into sludge, the calcium oxide reacts exothermically with the free water of sludge to create calcium hydroxide (hydrated lime, $Ca(OH)_2$) plus heat. Calcium hydroxide may also continue to react with carbon dioxide in the atmosphere to form calcium carbonate. Although this carbonation reaction is exothermic, the typical heat available is modest due to the slow rate of the reaction.

Either method described above requires a high dosage of lime to generate a disinfecting heat by the exothermic reaction known as the heat of hydration. In order to achieve pasteurization temperatures of 70° C., typical dosages are one pound of lime per pound of dry solids at a 20 percent initial solids concentration. The heat of hydration for lime is equivalent to approximately 491 BTUs per pound of lime. Additional chemical heats are available, such as carbon dioxide or the heat of carbonation, which release heat equivalent to approximately 780 BTUs per pound and may be used to reduce the lime requirement.

Numerous patents address the need for stabilization and sterilization. U.S. Pat. No. 4,270,279 issued to Roediger discloses a method of alkaline stabilization of dewatered sludge by the use of quicklime dust which results in the formation of pellets. The quicklime dust reacts exothermically with the surface of the pellets, resulting in a product that can be used as agricultural fertilizer.

U.S. Pat. Nos. 4,306,978 and 4,997,572 issued to Wurtz disclose a method of producing sludge pellets using sludge stabilized by lime by the inclusion of calcium oxide or similar alkaline materials and combinations thereof with dewatered wastewater sludge cake in a compartmented reactor. The mixture reacts with carbon dioxide providing disinfection, stabilization, and pelletizing of the sludge. The Wurtz method requires that the dewatered sludge is provided in a sludge cake which is blended with calcium oxide to form sludge particles. The sludge particles are then mixed with calcium oxide to form calcium hydroxide raising the pH of the mixture to a range of 11 to 13. The sludge is then placed into a second compartment wherein the reaction of calcium oxide with free water continues to form calcium hydroxide and raises the pH of the mixture to a selected pH. The sludge is finally placed into a third vessel to react with induced calcium hydroxide and carbon dioxide gas forming calcium carbonate to provide the basis for pellet formation.

One problem with the prior art occurs during the addition of lime as a primary step for purposes of stabilization and/or disinfection. The receipt of wastewater is not a fixed or known variable hence causing the addition of lime to become an unknown variable. The result is an uninhibited and often costly addition of lime to the sludge until the desired pH stabilization occurs. Another problem is odor control which is not effectively addressed by the prior art. The control of odor directly affects the acceptability of a wastewater treatment process.

U.S. Pat. No. 5,429,750 issued to Steele, which is incorporated herein by reference, discloses a method to remove pathogens from dewatered sludge and to reduce vector attraction that includes raising the pH above 12 and subjecting the sludge to a low or near zero ambient pressure. The vacuum exposure enhances pathogen destruction and helps remove odiferous gases U.S. Pat. No. 5,385,673 issued to Fergen, which is incorporated herein by reference, discloses a method of treating dewatered biosolids by reducing the pH to below 5 s.u. for a predetermined period of time, followed by raising the pH above 12 s.u. Acid volatile compounds can be removed prior to alkaline conditioning. Base volatile compounds can then be removed. The separation of acid and base volatile compounds aids odor control. By selecting specific acid and base materials, the odor producing substances, such as ammonia, may be chemically bound, thereby reducing odor control requirements. Fergen at FIG. 1, col. 2, lines 46–52, and col. 4, lines 53–61.

What is unknown in the prior art, is a method of treating municipal, agricultural, food processing, and industrial liquid and semi-liquid sludge to form insoluble residual precipitates with increased nutrient value, bind odors, reduce vector attraction, and greatly improve the sludge's dewatering characteristics.

SUMMARY OF THE INVENTION

The present invention provides a method to condition and dewater liquid wastewater sludges to form nutrient rich insoluble precipitates, to increase the nutrient value of the residual material, to control odors, to reduce vector attraction, to control pathogens, to greatly improve dewatering characteristics, and to provide operational flexibility. The method also produces a beneficial exothermic reaction for drying. The method includes the addition of selective acids and bases to the liquid sludge which forms insoluble precipitates, and enmeshes the solids in the sludge to formt a granular product. The method's applicability includes municipal, agricultural, food processing, and industrial liquid and semi-liquid sludges. The method could also be used to treat contaminated sediments and soil.

The acids and bases may be either mineral or organic, with by-products often being available.

The method comprises the steps of collecting liquid sludge (primary and waste), activating and digesting the sludge with an acid, such as sulfuric acid or phosphoric acid, adding ammonia if necessary to increase nitrogen in the residual, followed by a base such as MgO, CaO, KOH, or $NH_3$ in a reaction vessel. The solution is intensely mixed together.

The solution results in residual precipitates, which converts the pudding-like sludge into a wet, sand-like material with large grain size and clear liquid.

Optionally, additional base such as CaO, MgO, KOH, or $NH_3$, is placed in the solution to raise the pH if needed.

The resultant solids are put in a decant device, a cyclone type device, or a mechanical dewatering process, which could be a gravity filter press where the material is dewatered and decanted, a centrifugal separator, or other suitable mechanical dewatering device. The remaining solids are then heat or air dried. The process itself causes an exothermic reaction which aids in drying. Waste heat could be recycled to optimize the process. The temperature and time shall be in accordance with the requirements of Title 40 C.F.R. §503 for Class A pathogen control. As an example, seventy degrees C. for 30 minutes is sufficient for Class A pathogen reduction.

The biosolids satisfy vector attraction reduction (VAR) (reduction of attraction to pests such as rodents, flies, and mosquitos) by either being stabilized before the precipitate process, have a pH of 12 standard units (s.u.) for 2 hours and a pH of at least 11.5 s.u. after a subsequent 22 hours or being dewatered to at least 80 percent solids.

The residual material meets a Class A pathogen reduction by achieving disinfecting conditions, by heat and temperature, harsh pH conditions, high osmotic pressures, and enmeshment of the organic material in a solid precipitate. The resultant material is suitable for distribution and marketing, has a substantial nutrient value, and may be incorporated in a fertilizer blend.

It is an object of this invention to provide and condition liquid wastewater sludge for dewatering, nutrition enhancement and ultimate handling characteristics.

It is another object of this invention to form insoluble precipitates from liquid sludge and enmesh the solids to form a residual solid sludge, to bind odors, to increase nutrient value of the residual sludge, to greatly improve dewatering characteristics, and to create an exothermic reaction for drying.

In accordance with these and other objects which will become apparent hereinafter, the instant invention will now be described with particular reference to the accompanying drawings.

DESCRIPTION OF THE PREFERRED EMBODIMENTS

This invention provides a method for improving the dewatering and odor reduction characteristics of a liquid wastewater sludge or sediment or contaminated soils to ultimately form a dewatered solid residual that includes nutrition enhancement and a resultant material that is suitable for distribution and marketing, and for incorporation in a fertilizer blend. The material can meet Class A pathogen reduction by achieving disinfecting conditions.

Figure 1:
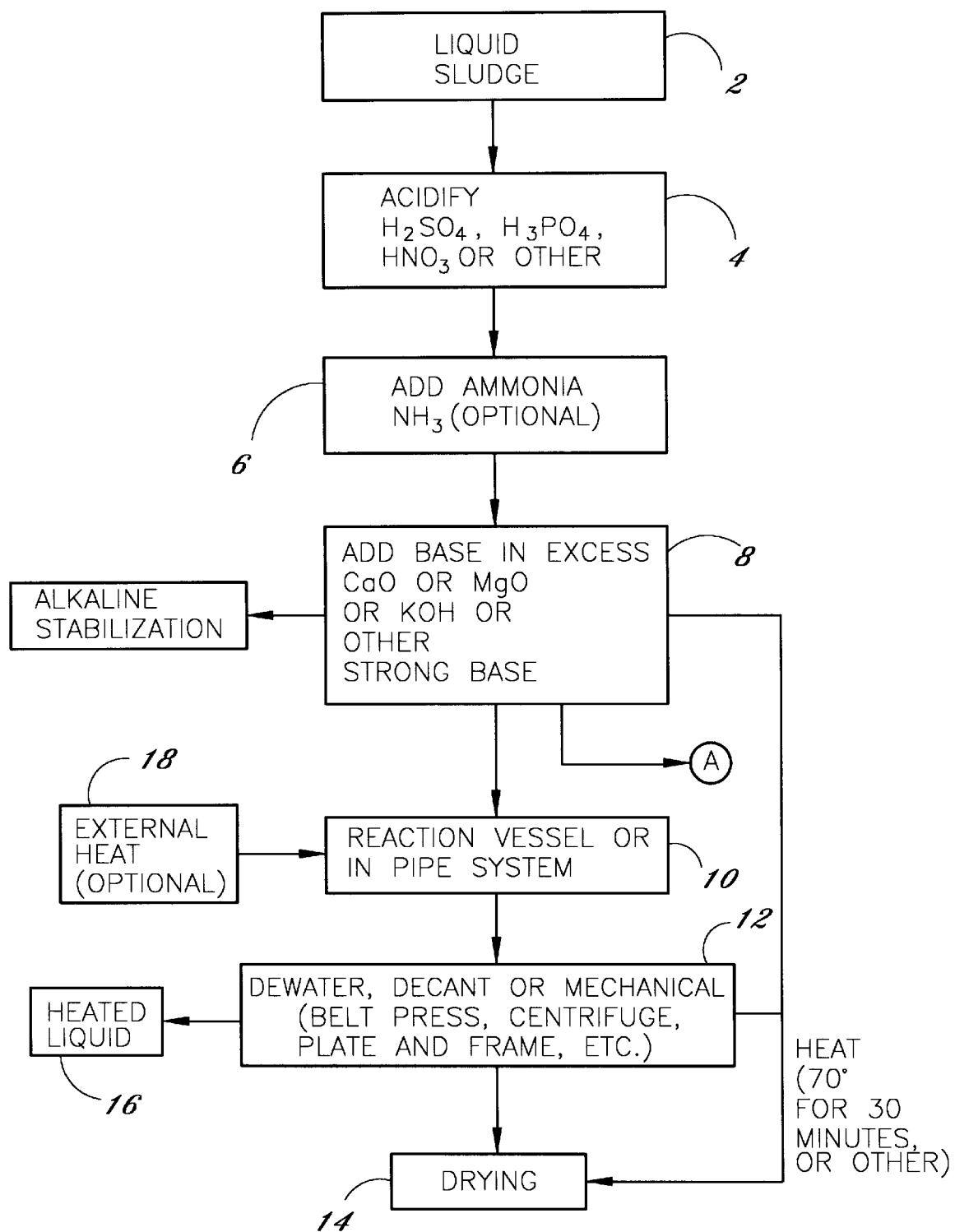
FIG. 1 is a flow diagram of the method of the present invention.

Referring now to FIG. 1, the initial liquid or semi-liquid sludge 2 is treated with mineral or organic acid 4 and, optionally, ammonia 6. The ammonia increases the nitrogen content of the ultimate product. An acid such as sulfuric acid ($H_2SO_4$) can be utilized at 4. organic acids such as oxalic, citric, and others may also be used. The acid and ammonia are combined in a reaction vessel 10 with the liquid sludge 2 to be treated. Any ammonia already contained in the liquid sludge will also react with the acid. An excess of acid can be added to ensure ammonia conversion. A base, such as CaO, is next added 8 to the reaction vessel 10 and the resultant solution is intensely mixed. External heat 18 optionally may be added to the reaction vessel 10.

After mixing, the sludge and additives form insoluble precipitates. The sludge is then dewatered 12, resulting in a residual precipitate material that is suitable for economic use such as in fertilizers. After the solids are dewatered and separated from the liquids 16, the solids are then air or heat dried to 80 percent solids or higher 14. Other temperature and time combinations are also suitable in accordance with Title 40 C.F.R. §503.

Acids 4 that can be used for treating the liquid sludge 2 include sulfuric acid ($H_2SO_4$), $H_3PO_4$, $HNO_3$, and other organic acids. Bases 8 that can be used in the preferred embodiment include magnesium oxide (MgO), calcium oxide (CaO), KOH, $NH_3$, calcium hydroxide (hydrated lime, $Ca(OH)_2$), and certain fly ashes and industrial by-products.

The present invention reduces or replaces polymers that are currently used to assist dewatering. The resultant material has a high value for recycling and also provides for an exothermic reaction that can aid in drying. The excess heat in the liquid from the dewatering operation may be recaptured to heat the incoming sludge or to assist in drying the dewatered material.

The original liquid sludge mixture, which has a pudding-like consistency, ends up as a solid, wet, sand-like precipitate which is readily dewatered and dried to a useable agronomically enhanced product.

EXAMPLE

Two tons of sulfuric acid 4 are added to liquid sludge 2 containing one ton of solids, followed by one ton of ammonia 6. Acid is added first if ammonia is added. One ton of base, such as CaO, is added 8 to the mixture which is in a reaction vessel 10 and intensely mixed. Exothermic reactions raise the temperature of the material, creating conditions which destroy pathogens. Adequate detention time may be achieved in a pipe or vessel. This reduces heat loss due to evaporation. The pH of the material is over 12 s.u., thus starting the alkaline stabilization process. The residual material is then decanted or mechanically dewatered 12, 30 minutes, 14.

EXAMPLE 2

Figure 2:
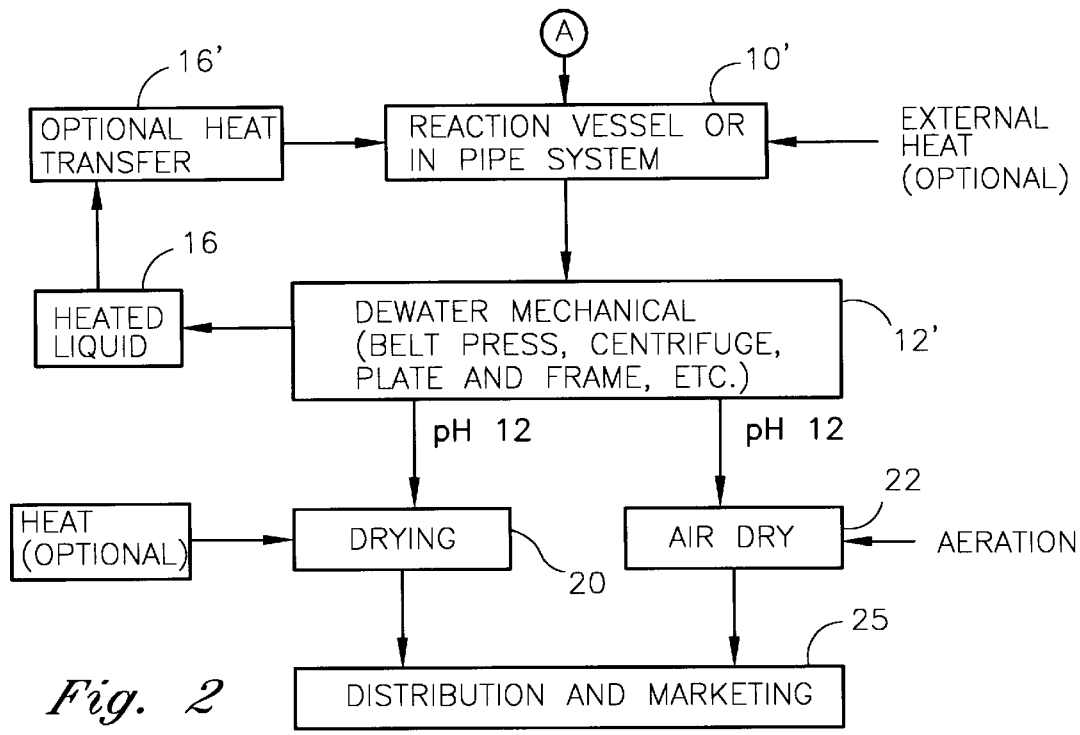
FIG. 2 is a flow diagram of an alternate embodiment of the present invention.

Referring now to FIG. 2, an alternate embodiment of the present invention is shown for vector attraction reduction (VAR) by raising the pH to 12 standard units for a predetermined period of time to stabilize the pH before drying. The pH can raised to 12 for 2 hours and should maintain a pH of at least 11.5 standard units after a subsequent 22 hours. The steps beginning at 2 and going to step 10 are identical as discussed in example 1 above, and shown in FIG. 1. The only difference is the optional utilization of heat transfer 16' from heated liquid 16.

For VAR, the mixture in the reaction vessel, shown as 10' in FIG. 2, is pH stabilized prior to the dewatering process 12'. After dewatering 12', the pH stabilized precipitate is dried at 20 or air dried at 22 prior to distribution and marketing 25.

EXAMPLE 3

Figure 3:
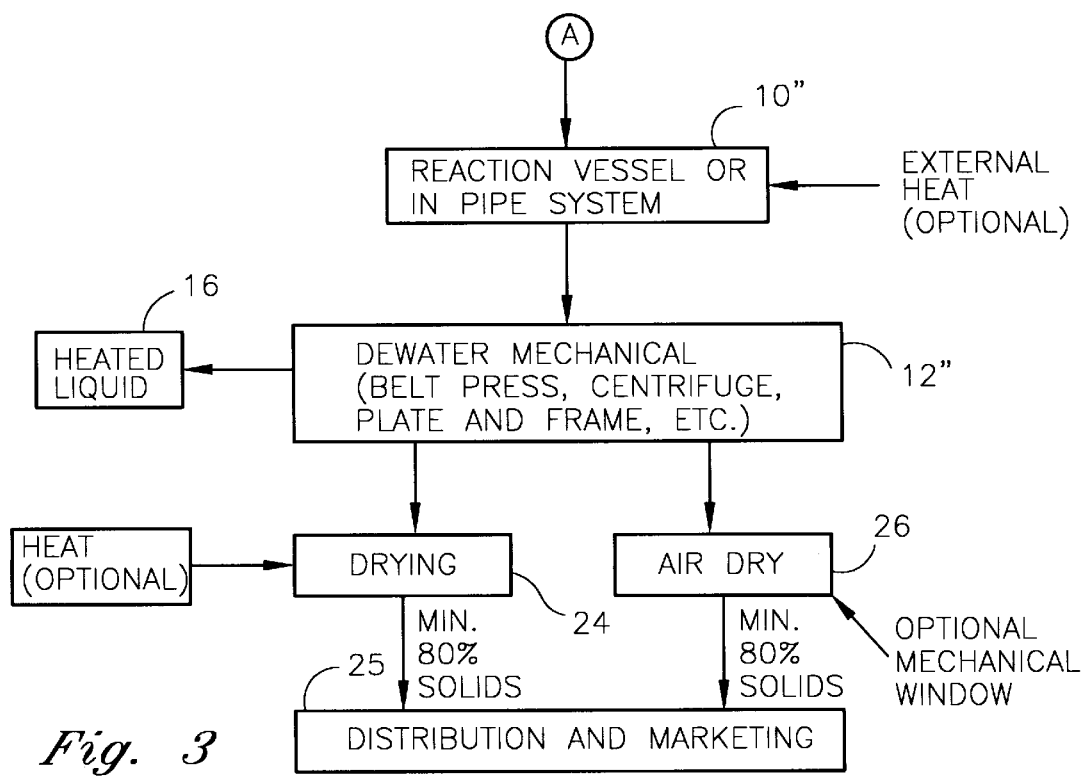
FIG. 3 is a flow diagram of an alternate embodiment of the present invention.

Referring now to FIG. 3, an alternate embodiment of the present invention is shown for vector attraction reduction (VAR) by dewatering and drying to at least 80 percent solids. The steps beginning at 2 and going to step 10 are identical as discussed in example 1 above, and shown in FIG. 1. After the reaction vessel, shown as 10" in FIG. 3, the dewatering process 12" and the drying process at 24 and 26 continues until at least 80 percent solids are available for distribution and marketing 25.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method to condition and dewater liquid wastewater sludges to form nutrient rich insoluble precipitates, to increase the nutrient value of the residual precipitate material, to control odors, to reduce vector attraction, to control pathogens and to greatly improve the dewatering characteristics of the resultant precipitate materials comprising the steps of:

(a) providing a mixing reaction vessel containing a liquid wastewater sludge;

(b) adding an acid selected from the group consisting of $H_2SO_4$, $H_3PO_4$, and $HNO_3$ to said liquid wastewater sludge in said reaction vessel;

(c) adding a base selected from the group consisting of MgO, CaO, KOH, $NH_3$ and $CA(OH)_2$ to said liquid wastewater sludge in said reaction vessel;

(d) intensely mixing said solution in said reaction vessel until residual precipitates are formed;

(e) separating the precipitated residual material from said liquid;

(f) placing said residual precipitated material in a dewatering device;

(g) dewatering said residual precipitates in said dewatering device; and (h) drying said residual precipitates.

2. The method as claimed in claim 1, wherein the step of drying includes heating the residual precipitates which includes raising the temperature for thirty minutes to at least 70° Centigrade for pathogen reduction.

3. The method as claimed in claim 1 wherein ammonia ($NH_3$) is added between steps b) and c).

4. The method as claimed in claim 1 including the step of raising and stabilizing the pH of the precipitate to a preselected pH standard unit prior to drying said precipitate.

5. The method as claimed in claim 4 wherein said preselected pH standard unit is approximately about 12.

6. The method as claimed in claim 1 including continuing the steps of dewatering and drying said precipitate until at least about 80 percent solids is reached.

* * * * *